United States Patent [19]

Grace

[11] Patent Number: 5,351,977
[45] Date of Patent: Oct. 4, 1994

[54] EXTERNALLY VENTED AIRBAG ASSEMBLY

[75] Inventor: Gregory B. Grace, Gilbert, Ariz.

[73] Assignee: TRW Inc., Lyndhurst, Ohio

[21] Appl. No.: 970,916

[22] Filed: Nov. 3, 1992

[51] Int. Cl.⁵ .................... B60R 21/28; B60R 21/30
[52] U.S. Cl. ................................ 280/738; 280/739; 280/743 R
[58] Field of Search ............... 280/739, 736, 731, 738, 280/743, 728 R

[56] References Cited

U.S. PATENT DOCUMENTS

| Re. 29,228 | 5/1977 | Hass | 280/738 |
|---|---|---|---|
| 3,680,884 | 8/1972 | Stephenson . | |
| 3,747,953 | 7/1973 | Goes et al. | 280/739 |
| 3,778,083 | 12/1973 | Hamasaki | 280/739 |
| 3,788,666 | 1/1974 | Kramer et al. | 280/739 |
| 3,801,123 | 4/1974 | Jira . | |
| 3,810,523 | 5/1974 | Yamaguchi et al. . | |
| 3,843,152 | 10/1974 | Nonaka | 280/731 |
| 3,861,712 | 1/1975 | Matsui et al. . | |
| 3,910,595 | 10/1975 | Katter et al. . | |
| 3,938,826 | 2/1976 | Giorgini et al. | 280/738 |
| 4,877,264 | 10/1989 | Cuevas | 280/731 |
| 5,100,172 | 3/1992 | Van Voorhies et al. | 280/739 |
| 5,140,799 | 8/1992 | Satoh | 280/743 R |

FOREIGN PATENT DOCUMENTS

1408084 10/1975 United Kingdom ............... 280/738
1420340 1/1976 United Kingdom .

Primary Examiner—Karin L. Tyson
Attorney, Agent, or Firm—Calfee Halter Griswold

[57] ABSTRACT

An airbag assembly (12/112) is incorporated into a vehicle (10) that includes a steering assembly (16/116) and a firewall (18). The firewall (18) at least partially defines an occupant compartment (20) and separates the occupant compartment (20) from an external environment (22). In one embodiment, the steering assembly (16) includes a steering column (50) defining an inlet passageway (71) and a separate exhaust passageway (73). The passageways (71) and (73) communicate separately with an airbag (30) through a mouth portion (32) of the airbag. The inlet passageway (71) communicates with an inflator (40), and the exhaust passageway (73) communicates with the external environment (22). Inflation fluid travels through the inlet passageway (71) into the airbag (30), and inflation fluid is vented through the outlet passageway (73) to the external environment (22). In another embodiment, the airbag (130) includes a mouth portion (132) which defines a fluid inlet opening and another portion (134) which defines one or more separate exhaust vents (136). Each exhaust vent (136) communicates with an exhaust passageway (173) in a steering column (150) to vent inflation fluid to the external environment (22).

15 Claims, 5 Drawing Sheets

EXTERNALLY VENTED AIRBAG ASSEMBLY

FIELD OF THE INVENTION

This invention relates to an airbag assembly which is vented to an external environment whereby vehicle occupants are not exposed to the vented inflation fluid and the effect of the venting process on the pressure in the occupant compartment is minimal. Additionally, the airbag assembly of the present invention is designed so that no "two way" flow patterns (and associated problems) are created during the venting process.

BACKGROUND OF THE INVENTION

An airbag assembly is commonly installed in a vehicle to protect an occupant (i.e., a driver or a passenger) in the event of a crash or collision. A typical airbag assembly will comprise an airbag and an inflator. At the onset of a crash or collision, the inflator supplies inflation fluid to the airbag to inflate the airbag into the occupant compartment. An occupant (who is moving forward by inertia) contacts the inflated airbag and is cushioned against impact with a structural part of the vehicle.

In some airbag assemblies, it is desirable to vent the inflated airbag either concurrently with or immediately following the occupant's initial contact with the airbag. Such venting of the inflation fluid permits the airbag to absorb the shock of impact in a gradual manner and provide a softer, less resilient surface for receiving the occupant.

Airbags often include one or more exhaust vents which allow inflation fluid to be "internally vented." In other words, the inflation fluid enters the airbag through an inlet opening and is subsequently vented through exhaust vents into the occupant compartment. However, in an internally vented airbag assembly, the inflation fluid and/or the airbag design must be chosen so that they do not have undesirable effects on an occupant. For example, the inflation fluid must be of a type which is not nauseating or otherwise unacceptable for inhalation by an occupant. Additionally or alternatively, the airbag must be designed so that the venting of the inflation fluid will not raise the pressure in the occupant compartment to an unsafe level or at an unsafe rate.

To overcome the problems commonly associated with internally vented airbag assemblies, airbag assemblies have been developed in which inflation fluid is exhausted to an environment external of the occupant compartment. (See U.S. Pat. No. 3,747,953 to Goes et al.; U.S. Pat. No. 3,778,083 to Hamasaki; U.S. Pat. No. 3,810,523 to Yamaguchi et al.; U.S. Pat. No. 3,861,712 to Matsui et al.; U.S. Pat. No. 4,877,265 to Cuevas; and U.S. Reissue No. 29,228 to Hass.) However, in these airbag assemblies, the inflation fluid enters the airbag through the inlet opening and is subsequently exhausted through the same fluid inlet opening. This "two-way" flow pattern through the airbag inlet opening may create turbulent conditions during the exhausting process.

In some externally vented airbag assemblies, the problems associated with two-way flow have been minimized by the use of valve structures. Such valve structures have likewise been incorporated into internally vented airbag assemblies. However, these valve structures tend to complicate the design, and increase the cost, of the airbag assembly.

Applicant therefore believes that a need remains for an externally vented airbag assembly in which no "two way" flow patterns (and associated problems) are created during the venting process. Additionally, or alternatively, applicant believes a need remains for a valve system which does not complicate the design, or increase the cost, of the airbag assembly.

SUMMARY OF THE INVENTION

The present invention provides an airbag assembly in which inflation fluid is vented to an environment external of a vehicle occupant compartment. In this manner, vehicle occupants are not exposed to the vented inflation fluid, and the effect of the venting process on the pressure in the occupant compartment is minimal. Additionally, the inflation fluid is vented in such a manner that no "two way" flow patterns (and associated problems) are created.

More particularly, the present invention provides an airbag assembly which is incorporated into a vehicle. The vehicle comprises a steering assembly and a firewall. The firewall partially defines an occupant compartment and separates the occupant compartment from an external environment. The steering assembly is positioned at least partially within the occupant compartment and the airbag assembly is mounted on the steering assembly. The airbag assembly comprises an airbag and an inflator which supplies inflation fluid to the airbag to inflate the airbag into the occupant compartment.

In one embodiment of the present invention, the steering assembly includes a steering column defining an inlet passageway and a separate exhaust passageway. The inlet passageway communicates with the inflator and the airbag. The outlet passageway communicates with the airbag and the external environment. Inflation fluid travels through the inlet passageway into the airbag and is vented to the external environment through the exhaust passageway.

In another embodiment of the present invention, the steering assembly includes a steering column defining an exhaust passageway which communicates with the external environment. The airbag includes a mouth portion which defines a fluid inlet opening and another portion which defines one or more exhaust vents. Each exhaust vent communicates with the exhaust passageway to vent inflation fluid from the airbag to an external environment. Preferably, the airbag defines a chamber which is closed except for the fluid inlet opening and the exhaust vents.

The present invention also provides a valve system which does not complicate the design, or increase the cost, of the airbag assembly. Specifically, the present invention provides an airbag assembly comprising an airbag and an inflator. The airbag has a portion defining a fluid inlet opening and a portion defining one or more exhaust vents. During deployment of the airbag assembly, the inflator supplies inflation fluid into the fluid inlet opening to inflate the airbag into the occupant compartment. The airbag is folded in a pre-deployment folding pattern in which the exhaust vents are blocked during early stages of the deployment process. The exhaust vents are subsequently unblocked to vent the inflation fluid during latter stages of the deployment process. Thus, certain already essential components of the airbag assembly function as valves during the venting process.

These and other features of the invention are fully described and particularly pointed out in the claims. The following descriptive annexed drawings set forth in detail certain illustrative embodiments, these embodiments being indicative of but a few of the various ways in which the principles of the invention may be employed.

DETAILED DESCRIPTION

Figure 1:
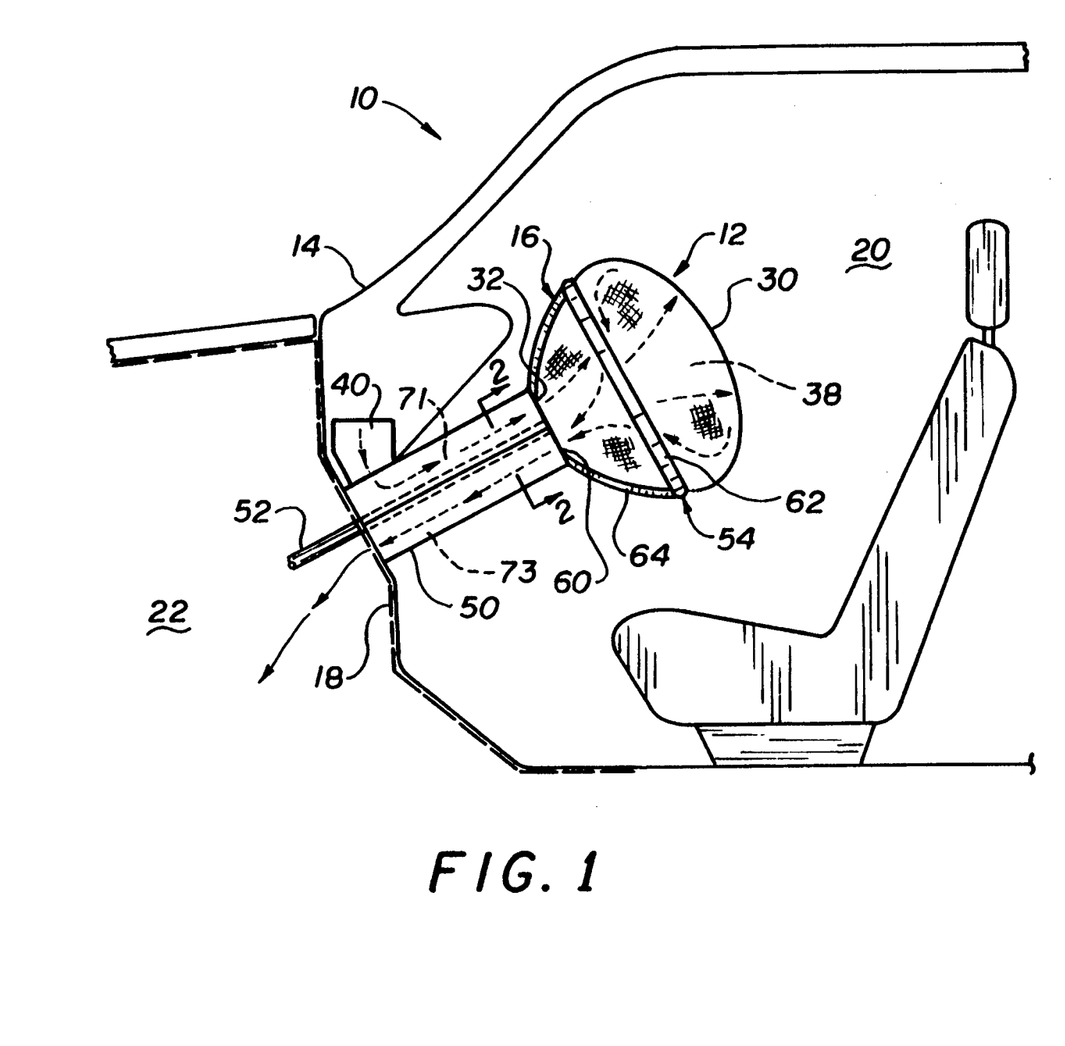
FIG. 1 is a schematic view of a vehicle incorporating an airbag assembly according to one embodiment of the present invention.

Referring now to the drawings in detail, a vehicle 10 is shown in FIG. 1 which incorporates an airbag assembly 12 according to the present invention. The vehicle comprises a body 14 and a steering assembly 16. The body 14 includes a firewall 18 which partially defines an occupant compartment 20 and which separates the occupant compartment 20 from an external environment 22. As is explained in more detail below, the airbag assembly 12 is vented to the external environment 22. In this manner, the vehicle occupants will not be exposed to the vented inflation fluid, and the effect of the venting process on the pressure in the occupant compartment 20 will be minimal. Additionally, the design of the airbag assembly 12 is such that no "two way" flow patterns (and associated problems) are created during the venting process.

The airbag assembly 12 comprises an airbag 30 which is preferably made of a flexible fabric, such as nylon. The airbag 30 includes a mouth portion 32 which defines an opening. The remaining portions of the airbag 30 are substantially impervious to inflation fluid flow, for example, through the use of an elastomeric coating or a tight weave of the airbag fabric. The airbag 30 thus defines a chamber 38 which is closed except for the opening defined by the mouth portion 32. During deployment of the airbag assembly 12, the airbag 30 inflates to a generally ellipsoid shape, such as is shown in FIG. 1. Although not specifically shown in the drawings, the airbag assembly 12 may include a cover which encloses the airbag 30, in a folded condition, prior to deployment.

The airbag assembly 12 additionally comprises an inflator 40, which is shown schematically in FIG. 1. The inflator 40 includes a fluid source for supplying an inflation fluid to inflate the airbag 30. The fluid source may constitute a chemical mixture which, when ignited, generates large quantities of an inert gas such as nitrogen. During deployment of the airbag assembly 12, the inflator 40 supplies inflation fluid to the airbag 30 to inflate the airbag into the occupant compartment 20.

The steering assembly 16 comprises a steering column 50, a steering shaft 52, and a steering wheel 54. In the embodiment illustrated in FIG. 1, the steering column 50 extends from the firewall 18 and into the occupant compartment 20. The steering shaft 52, which controls the steering of the vehicle 10, is rotatably positioned within the steering column 50. The steering wheel 54 includes a hub 60, an outer ring 62, and a plurality of spokes 64 which extend between the hub 60 and the outer ring 62. The hub 60 is connected to the steering shaft 52 so that the outer ring 62 may be turned to rotate the steering shaft 52 during operation of the vehicle 10. The mouth portion 32 of the airbag 30 is coupled to the steering wheel hub 60. Thus, the airbag 30 turns with the steering wheel 54 during operation of the vehicle.

Figure 2:
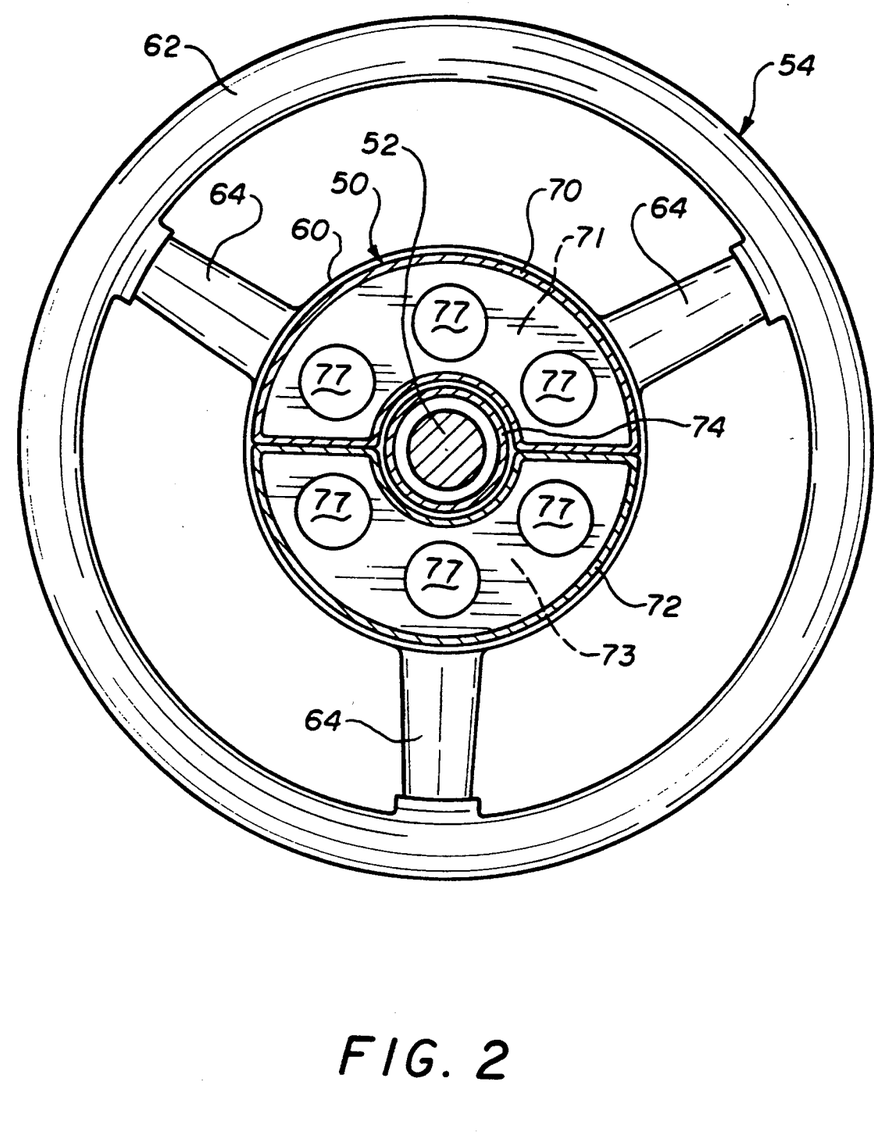
FIG. 2 is an enlarged view, taken along lines 2—2 of FIG. 1, of the steering wheel assembly of the vehicle of FIG. 1 and the airbag assembly mounted thereon.

As is best seen by referring to FIG. 2, the steering column 50 is comprised of an inlet casing 70, which forms an inlet passageway 71, an exhaust casing 72, which forms an exhaust passageway 73, and a shaft housing 74, which surrounds the steering shaft 52. The casings 70 and 72 are substantially semi-cylindrical in shape. Each casing 70 and 72 includes an inner indentation to accommodate the centrally located cylindrical shaft housing 74. The hub 60 includes a plurality of inlet ports 77 which communicate with the chamber 38 of the airbag 30 through the mouth portion 32.

The inflator 40 is mounted to a lower portion of the inlet casing 70. An opening is provided in the casing 70 so that the inflator 40 may communicate with the inlet passageway 71. During deployment of the airbag assembly 12, inflation fluid flows from the inflator 40, into the inlet passageway 71, through the inlet ports 77, and into the airbag chamber 38. (See arrows in FIG. 1.) The lower end (i.e., opposite the steering wheel 54) of the exhaust casing 72 is open to communicate the exhaust passageway 73 with the external environment 22. During the latter stages of the deployment process, at least a percentage of the inflation fluid travels from the airbag chamber 38, through the ports 77, into the exhaust passageway 73, and subsequently exhausts to the external environment 22. (See arrows in FIG. 1.) Because the inflation fluid is externally vented in this manner, vehicle occupants are not exposed to the vented inflation fluid, and the effect of the venting process on the pressure in the occupant compartment 20 is minimal. Additionally, because of the separate inlet and exhaust passageways 71 and 73, no "two way" flow patterns are created during the venting process.

Figure 3A:
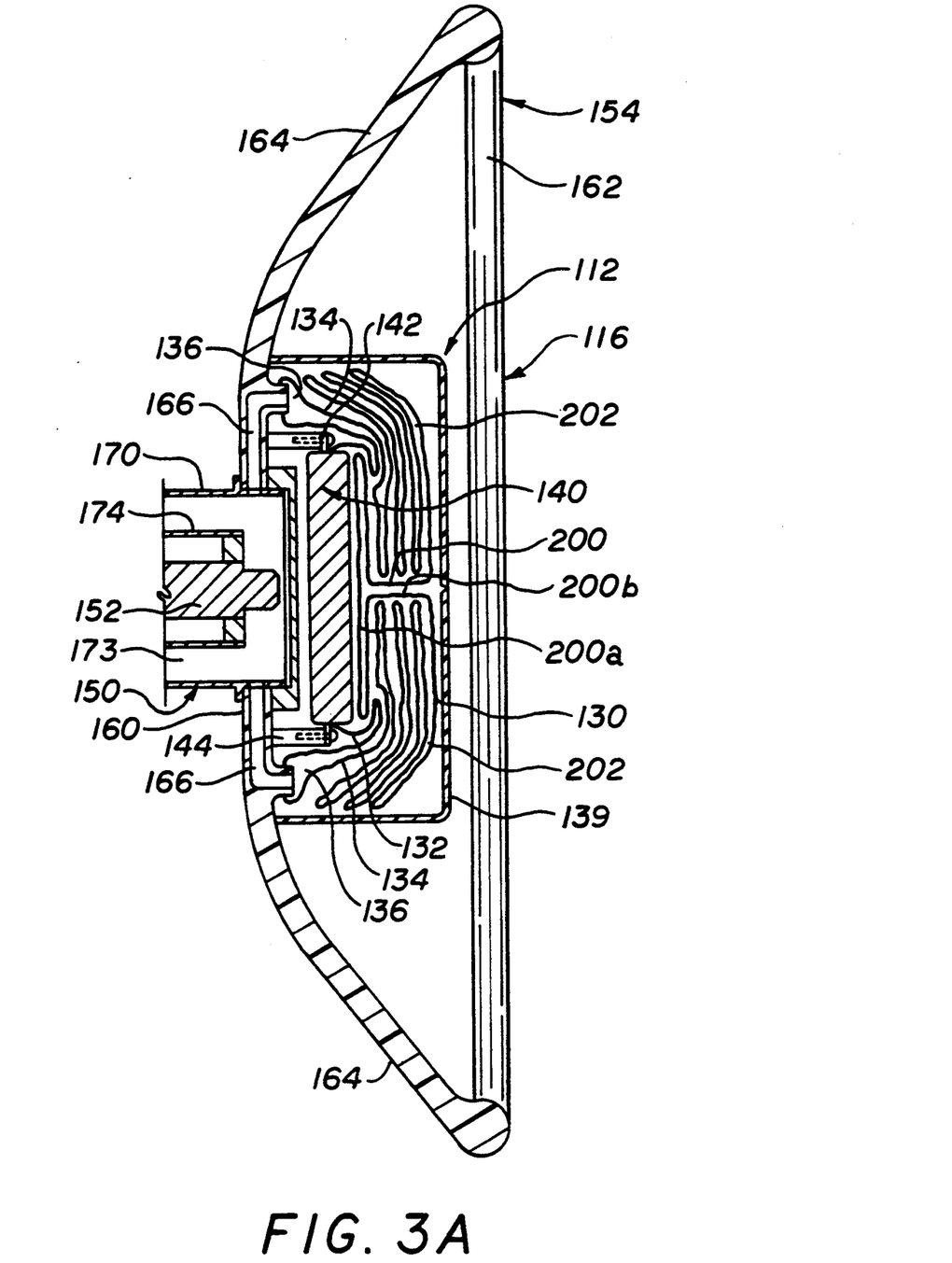
FIGS. 3A-3C are sectional views of an airbag assembly according to another embodiment of the invention, the airbag assembly being shown incorporated into a steering assembly and in various stages of the deployment process.
Figure 3B:
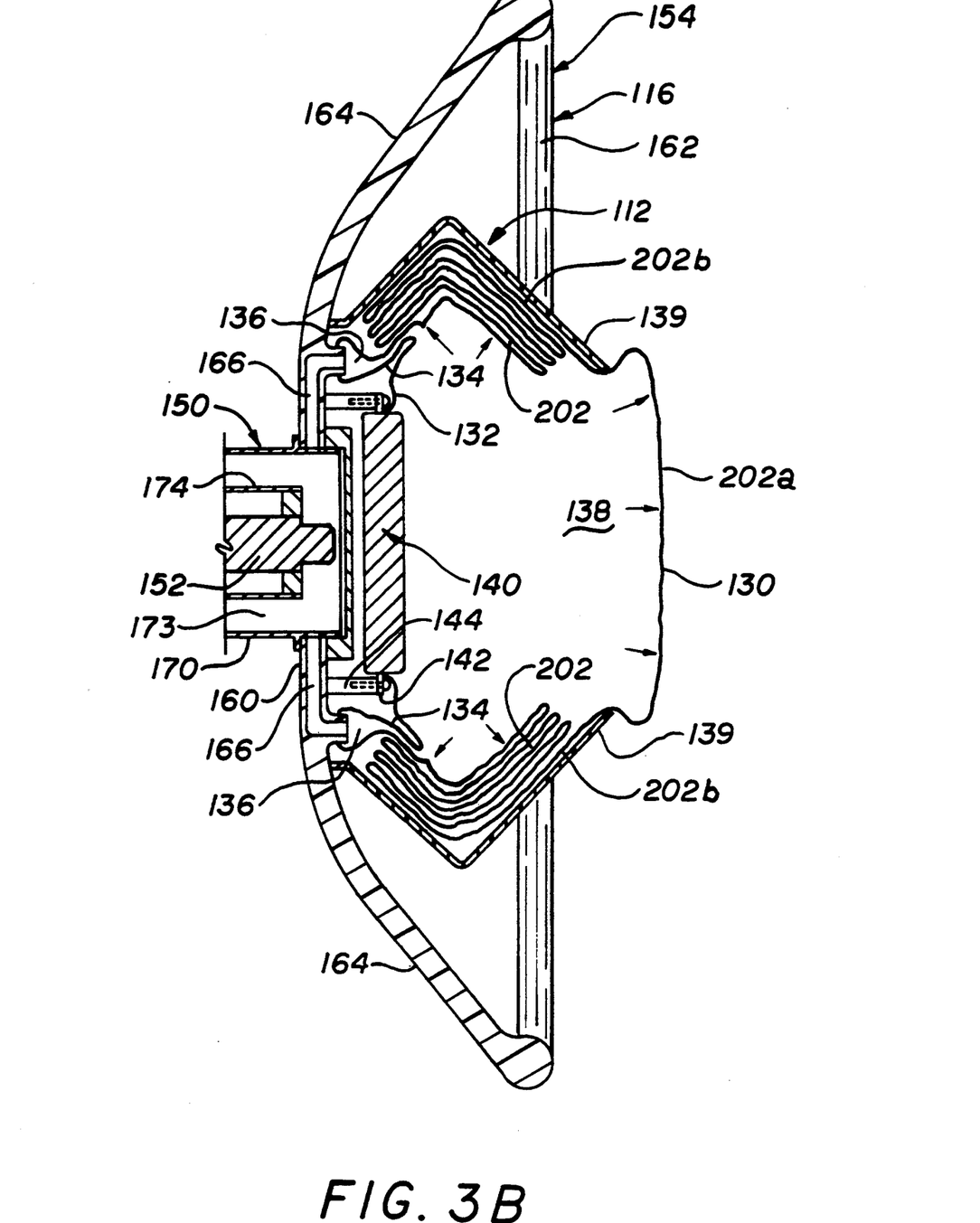
Figure 3C:
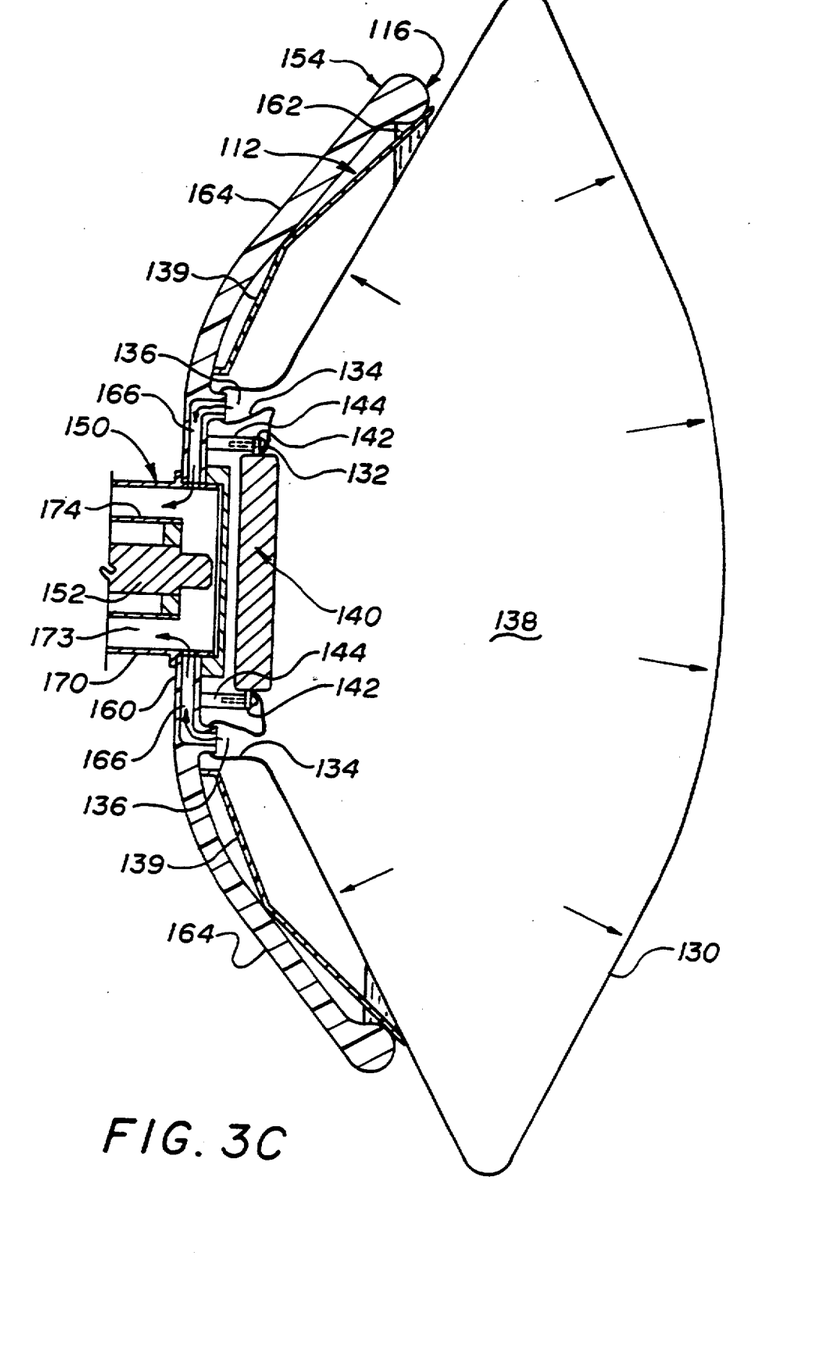

Turning now to FIGS. 3A-3C, an airbag assembly 112 according to another embodiment of the invention is shown in various stages of the deployment process. The airbag assembly 112 is illustrated with the relevant parts of the vehicle, namely a steering assembly 116. As with the airbag assembly 12 discussed above, the airbag assembly 112 is vented to an environment external of the occupant compartment of the vehicle. Thus, vehicle occupants will not be exposed to the vented inflation fluid, and the effect of the venting process on the pressure in the occupant compartment will be minimal. Additionally, the design of the airbag assembly 112 is such that no "two way" flow patterns (and associated problems) are created during the venting process. A further advantage of the airbag assembly 112 is that certain already essential components of the assembly function as valves during the venting process.

The airbag assembly 112 comprises an airbag 130 which includes a mouth portion 132 defining an inlet opening and tubular portions 134 which define exhaust vents 136. The tubular portions 134 are arranged adjacent to (but radially offset and separate from) the inlet opening. The remaining portions of the airbag 130 are substantially impervious to inflation fluid flow, like the airbag 30. The airbag 130 thus defines a chamber 138 which is closed except for the inlet opening and the exhaust vents 136. The airbag assembly 112 may also include a cover 139 which encloses the airbag 130 in a folded pre-deployment condition (see FIG. 3A) and which separates to release the airbag (see FIGS. 3B and 3C).

The airbag assembly 112 additionally comprises an inflator 140 for supplying an inflation fluid to inflate the airbag 130 into the occupant compartment 20. The inflator 140 preferably comprises a toroidal housing enclosing an inflation fluid source (not shown). ("Toroidal" in this context refers to a housing having a radial dimension which is substantially greater than its axial dimension.) The inflator 140 may include a radial mounting flange 142 for mounting the inflator 140 to the vehicle, or, more particularly, the steering assembly 116, via suitable fastening elements 144.

The steering assembly 116 comprises a steering column 150, a steering shaft 152, and a steering wheel 154. The steering column 150 extends from (or through) the vehicle's firewall and into the occupant compartment. The steering shaft 152 is rotatably positioned within the steering column 150. The steering wheel 154 includes a hub 160, an outer ring 162, and a plurality of spokes 164 which extend between the hub 160 and the outer ring 162. The hub 160 is connected to the steering shaft 152 so that the outer ring 162 may be turned to rotate the steering shaft 152 during operation of the vehicle. Additionally, the hub 160 includes a set of channels 166 which extend radially from and communicate with the interior of the steering column 150.

The inflator 140 is coupled to the steering wheel hub 160, and the mouth portion 132 of the airbag 130 is attached to the inflator 140. Additionally, the outlet end of each airbag tubular portion 134 is attached to the hub 160 in such a manner that the exhaust vents 136 communicate with the channels 166. The cover 139 is also coupled to the steering wheel hub 160 in an appropriate manner. Thus, the inflator 140, the airbag 130, and the cover 139 all turn with the steering wheel 154 during operation of the vehicle.

The steering column 150 is comprised of a cylindrical casing 170, which forms an exhaust passageway 173, and a shaft housing 174, which surrounds the steering shaft 152. An upper portion (i.e., adjacent the steering wheel 154) of the casing 170 includes appropriate openings so that the exhaust passageway 173 communicates with the channels 166. The lower end (i.e., opposite the steering wheel 154) of the casing 170 is open to communicate the exhaust passageway 173 with the external environment 22.

During deployment of the airbag assembly 112, inflation fluid flows from the inflator 140 into the airbag chamber 138. During the latter stages of the deployment process, at least a percentage of the inflation fluid travels from the airbag chamber 138, through the exhaust vents 136, into the hub channels 166, through the exhaust passageway 173, and subsequently exhausts to the external environment. Because the inflation fluid is externally vented in this manner, vehicle occupants are not exposed to the vented inflation fluid, and the effect of the venting process on the pressure in the occupant compartment is minimal. Additionally, because the airbag inlet (defined by the mouth portion 132) is separate from the airbag exhaust vents 136, no "two way" flow patterns are created during the venting process.

As was indicated above, a further advantage of the airbag assembly 112 is that certain already essential components of the assembly function as valves during the venting process. Specifically, the airbag 130 is folded in a pre-deployment pattern (see FIG. 3A) which causes the exhaust vents 136 to be blocked during the early stages of the deployment process (see FIG. 3B). The exhaust vents 136 are subsequently unblocked to vent the inflation fluid during latter stages of the deployment process (see FIG. 3C). In this manner, the venting of inflation fluid may be delayed until a desired point in the deployment process. Although this valve feature is shown only in connection with an externally vented airbag assembly, use of this feature with other types of airbag assemblies is possible and contemplated.

In the preferred and illustrated embodiment, the pre-deployment folding pattern consists essentially of a mushroom-shaped fold 200 and a symmetrical pair of accordion pleats 202 separated by the mushroom-shaped fold 200. The mushroom-shaped fold 200 is formed from the passenger-contacting portion of the airbag 130. Specifically, a central section of the passenger-contacting portion forms the "top" 200a of the mushroom-shaped fold, while sections of the passenger-contacting portion adjacent the central section overlap to form the "stem" 200b of the mushroom-shaped fold. The top 200a is positioned immediately adjacent the inflator 140 and the stem 200b extends axially away from the inflator. The accordion pleats, which are formed from the remaining portions of the airbag 130, are positioned to overlie the mushroom top 200a on either side of the mushroom stem 200b. (See FIG. 3A.)

During the early stages of the deployment process, the top 200a of the mushroom-shaped fold is pushed axially away from the inflator 140 and the two layers forming the stem 200b are pushed radially or sidewardly. The sidewardly pushed layers in turn push the accordion pleats 202 sidewardly. At least some of the pleats 202 are pushed against the inlet ends of the tubular portions 134 thereby blocking the exhaust vents 136. (See FIG. 3B.) The packing of the accordion pleats 202 above the exhaust vents 136 encourages the vents to collapse when the airbag is in its pre-deployment condition. Perpendicular folds in the tubular portions 134 forming the vents also tend to obstruct the flow of inflation fluid.

As the deployment process is continued, the accordion pleats are unfolded and the exhaust vents 136 are eventually unblocked so that the venting of the inflation fluid will begin. (See FIG. 3C.)

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. In combination, a vehicle and an airbag assembly;
said vehicle comprising a steering assembly and a firewall;
said firewall partially defining an occupant compartment and separating said occupant compartment from an external environment;
said steering wheel assembly being positioned at least partially within said occupant compartment;
said airbag assembly being mounted on said steering assembly;
said airbag assembly comprising an airbag and an inflator which supplies inflation fluid to said airbag to inflate said airbag into said occupant compartment;

said steering assembly comprising a steering column defining an inlet passageway which communicates with said airbag and a separate exhaust passageway which communicates with said airbag separately and independently of said inlet passageway;

said inlet passageway communicating with said inflator whereby inflation fluid travels through said inlet passageway into said airbag; and said exhaust passageway communicating with said external environment whereby at least a certain portion of said inflation fluid is vented to said external environment.

2. The combination set forth in claim 1 wherein said airbag includes a mouth portion which defines an opening and said airbag defines a chamber which is closed except for said opening.

3. The combination set forth in claim 2 wherein said steering assembly further comprises a steering shaft and a steering wheel;

said steering shaft is rotatable relative to said steering column and controls the steering of said vehicle during operation of said vehicle;

said steering wheel is fixedly coupled to said steering shaft; and said steering wheel includes a hub and said airbag is coupled to said hub.

4. In combination, a vehicle and an airbag assembly;

said vehicle comprising a steering assembly and a firewall;

said firewall partially defining an occupant compartment and separating said occupant compartment from an external environment;

said steering assembly being positioned at least partially within said occupant compartment;

said steering assembly comprising a steering column defining an exhaust passageway which communicates with said external environment;

said airbag assembly being mounted on said steering assembly;

said airbag assembly comprising an airbag including a mouth portion which defines a fluid inlet opening and another portion which defines one or more exhaust vents;

said airbag assembly further comprising an inflator which supplies inflation fluid into said fluid inlet opening to inflate said airbag into said occupant compartment; and each of said exhaust vents communicating with said exhaust passageway to vent inflation fluid from said airbag to said external environment.

5. The combination set forth in claim 4 wherein said airbag defines a chamber which is closed except for said fluid inlet opening and said exhaust vents.

6. The combination set forth in claim 5 wherein said steering assembly further comprises a steering shaft and a steering wheel;

said steering shaft is rotatable relative to said steering column and controls the steering of said vehicle during operation of said vehicle;

said steering wheel is fixedly coupled to said steering shaft; and said steering wheel includes a hub and said airbag and said inflator are coupled to said hub.

7. The combination set forth in claim 6 wherein:

said hub defines a set of channels which communicate with said exhaust passageway; and said portion of said airbag defining said exhaust vents is coupled to said hub in such manner that each of said exhaust vents communicates with one of said channels whereby inflation fluid will travel through said exhaust vents, into said channels, into said exhaust passageway, and subsequently exhaust to said external environment.

8. In combination, a vehicle and an airbag assembly;

said vehicle comprising a firewall which partially defines an occupant compartment and separates said occupant compartment from an external environment;

said airbag assembly being coupled to said vehicle;

said airbag assembly comprising an airbag that defines a chamber which is closed except for a fluid inlet opening and one or more separate exhaust vents;

said airbag assembly further comprising an inflator which supplies inflation fluid into said fluid inlet opening to inflate said airbag into said occupant compartment; and each of said exhaust vents communicating with said external environment separately and independently of said fluid inlet opening whereby said inflation fluid is vented to said external environment.

9. The combination set forth in claim 8 wherein said vehicle further comprises a steering assembly positioned at least partially within said occupant compartment and wherein said airbag assembly is mounted to said steering assembly.

10. The combination set forth in claim 9 wherein said steering assembly comprises a steering column defining an exhaust passageway between said exhaust vents and said external environment.

11. An airbag assembly comprising an airbag and an inflator;

said airbag having a portion defining a fluid inlet opening and a portion defining one or more exhaust vents;

said inflator being positioned to supply inflation fluid into said fluid inlet opening to inflate said airbag during a deployment process;

said airbag being folded in a pre-deployment folding pattern in which said exhaust vents are blocked during early stages of said deployment process and are subsequently unblocked to vent said inflation fluid during latter stages of said deployment process;

said pre-deployment folding pattern consisting essentially of a mushroom-shaped fold and a pair of accordion pleats separated by said mushroom-shaped fold, said mushroom-shaped fold substantially blocking said inflator so that during said early stages of said deployment process said pair of accordion pleats are forced by said mushroom-shaped fold in a direction radially outward from an axis defined by the direction of fluid flow into said airbag.

12. An airbag assembly comprising an airbag and an inflator;

said airbag having a portion defining a fluid inlet opening and a portion defining one or more exhaust vents;

said inflator being positioned to supply inflation fluid into said fluid inlet opening to inflate said airbag during a deployment process;

said airbag being folded in a pre-deployment folding pattern in which said exhaust vents are blocked during early stages of said deployment process and are subsequently unblocked to vent said inflation fluid during latter stages of said deployment process said pre-deployment folding pattern consisting essentially of a mushroom-shaped fold and a pair of accordion pleats separated by said mushroom-shaped fold;

said mushroom-shaped fold being formed from a passenger-contacting portion of said airbag and includes a top and a stem;

a central section of said passenger-contacting portion forms said top of said mushroom-shaped fold;

sections of said passenger-contacting portion adjacent said central section overlapping to form said stem of said mushroom-shaped fold;

said top being positioned immediately adjacent said inflator and said stem extends outwardly from said inflator;

said accordion pleats being formed from remaining portions of said airbag; and said accordion pleats being positioned outwardly from said top of said mushroom-shaped fold and on either side of said stem of said mushroom-shaped fold.

13. In combination, a vehicle and an airbag assembly;

said vehicle comprising a steering assembly and a firewall;

said firewall partially defining an occupant compartment and separating said occupant compartment from an external environment;

said steering assembly being positioned at least partially within said occupant compartment;

said airbag assembly being mounted on said steering assembly;

said airbag assembly comprising an airbag and an inflator which supplies inflation fluid to said airbag to inflate said airbag into said occupant compartment, said airbag including a mouth portion which defines an opening and said airbag defining a chamber which is closed except for said opening;

said steering assembly comprising (i) a steering column comprising an inlet casing, an outlet casing, and a shaft housing, said inlet casing defining an inlet passageway which communicates with said airbag, said exhaust casing defining an exhaust passageway which also communicates with said airbag, (ii) a steering shaft which is surrounded by said shaft housing and which is rotatable relative to said steering column to control the steering of said vehicle during operation of said vehicle, and (iii) a steering wheel which is fixedly coupled to said steering shaft and which includes a hub to which is coupled said airbag, said hub including a plurality of ports allowing said inlet passageway and said exhaust passageway to communicate with said chamber of said airbag;

said inlet passageway communicating with said inflator whereby inflation fluid travels through said inlet passageway into said airbag; and said exhaust passageway communicating with said external environment whereby at least a certain portion of said inflation fluid is vented to said external environment.

14. The combination set forth in claim 13 wherein said inflator is mounted to a portion of said inlet casing and an opening is provided in said inlet casing so that said inflator may communicate with said inlet passageway.

15. An airbag assembly comprising an airbag and an inflator;

said airbag having a portion defining a fluid inlet opening and a portion defining one or more exhaust vents;

said inflator being positioned to supply inflation fluid into said fluid inlet opening to inflate said airbag during a deployment process;

said airbag being folded in a pre-deployment folding pattern in which said exhaust vents are blocked during early stages of said deployment process and are subsequently unblocked to vent said inflation fluid during latter stages of said deployment process;

said pre-deployment folding pattern comprising a mushroom-shaped fold and a pair of accordion pleats separated by said mushroom-shaped fold, said mushroom-shaped fold substantially blocking said inflator so that during said early stages of said deployment process said pair of accordion pleats are forced by said mushroom-shaped fold in a direction radially outward from an axis defined by the direction of fluid flow into said airbag.

* * * * *

UNITED STATES PATENT AND TRADEMARK OFFICE
CERTIFICATE OF CORRECTION

PATENT NO. : 5,351,977
DATED : October 4, 1994
INVENTOR(S) : Gregory B. Grace

It is certified that error appears in the above-indentified patent and that said Letters Patent is hereby corrected as shown below:

Delete drawing sheet 5 of 5, and substitute therefor the drawing sheet consisting of Fig. 3C, as shown on the attached page.

Signed and Sealed this

First Day of August, 1995

*Attest:*

BRUCE LEHMAN

*Attesting Officer*       *Commissioner of Patents and Trademarks*

FIG. 3C